United States Patent
Madsen et al.

(10) Patent No.: US 7,031,143 B2
(45) Date of Patent: Apr. 18, 2006

(54) PORTABLE COMPUTING DEVICE WITH FOLDABLE KEYBOARD

(75) Inventors: Jeffrey C. Madsen, Eagle, ID (US); Cameron Hutchings, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 196 days.

(21) Appl. No.: 10/661,925

(22) Filed: Sep. 12, 2003

(65) Prior Publication Data

US 2005/0057891 A1    Mar. 17, 2005

(51) Int. Cl.
*G06F 1/16*    (2006.01)

(52) U.S. Cl. ................ 361/680; 400/683; 341/22

(58) Field of Classification Search ............. 361/680, 361/681, 683; 312/208.1, 208.4, 223.1; 400/82, 400/88, 100, 472–492, 682, 683; 341/22; 345/168, 156, 22; 235/146, 462.43, 462.44; 455/90, 557, 566; 200/5 EA, 5 EB, 52 R, 200/61 R; D14/331, 333, 338, 346
See application file for complete search history.

(56) References Cited

U.S. PATENT DOCUMENTS

| | | | |
|---|---|---|---|
| 5,278,779 A * | 1/1994 | Conway et al. ............. 361/680 |
| 5,457,453 A * | 10/1995 | Chiu et al. .................. 341/22 |
| 5,515,305 A | 5/1996 | Register et al. |
| 5,841,635 A | 11/1998 | Sadler et al. |
| 5,941,787 A | 8/1999 | Imaida et al. |
| 5,943,041 A * | 8/1999 | Allison et al. .............. 345/168 |
| 5,982,613 A * | 11/1999 | Sternglass et al. .......... 361/680 |
| 6,088,220 A * | 7/2000 | Katz ........................... 361/680 |
| 6,151,012 A * | 11/2000 | Bullister .................... 345/168 |
| 6,256,017 B1 * | 7/2001 | Bullister .................... 345/168 |
| 6,457,996 B1 | 10/2002 | Shih |
| 6,507,336 B1 * | 1/2003 | Lunsford .................... 345/168 |
| 6,585,162 B1 * | 7/2003 | Sandbach et al. ....... 235/462.44 |
| 6,587,675 B1 * | 7/2003 | Riddiford ................... 455/557 |
| 6,594,142 B1 * | 7/2003 | Katz ........................... 361/680 |
| 6,603,408 B1 | 8/2003 | Gaba |
| 6,614,649 B1 | 9/2003 | Wang |
| 6,628,508 B1 * | 9/2003 | Lieu et al. .................. 361/680 |
| 6,774,888 B1 * | 8/2004 | Genduso ..................... 345/168 |
| 6,785,126 B1 * | 8/2004 | Hazzard et al. ............. 361/680 |
| 2002/0063690 A1 | 5/2002 | Chung |
| 2004/0052044 A1 * | 3/2004 | Mochizuki et al. ......... 361/683 |
| 2005/0017953 A1 * | 1/2005 | Pekka ......................... 345/169 |

FOREIGN PATENT DOCUMENTS

| | | | |
|---|---|---|---|
| JP | 06337733 A | * | 12/1994 |
| WO | WO02/08876 A2 | | 1/2002 |
| WO | WO03/060681 A2 | | 7/2003 |

* cited by examiner

*Primary Examiner*—Lisa Lea-Edmonds

(57) ABSTRACT

A personal digital assistant comprises a body having a display; and a keyboard attached to the body, the keyboard being divided into two separate sections and being foldable between a closed position and an open position, wherein the keyboard provides a cover for the body in the closed position and functions as an alphanumeric keyboard to input data in the open position.

21 Claims, 3 Drawing Sheets

PORTABLE COMPUTING DEVICE WITH FOLDABLE KEYBOARD

BACKGROUND

Portable computers, such as personal digital assistants (PDAs) and data organizers, are typically smaller than a notebook or laptop computer. These smaller computing devices store personal information and provide an interface for communications. They typically include means for data input and display, data processing, and telecommunications.

PDAs, for example, generally have a rectangular body with a touch sensitive screen or display. In contrast to many portable computers, a PDA does not contain a traditional, large "QWERTY" keyboard. Instead, PDAs are often equipped with a stylus and control buttons on the front surface. The stylus can be used to interact with the touch sensitive display to enter and access data. Some PDAs can simulate an alphabetical or numerical keypad on the display. By touching the display at a designated image, a user can enter corresponding numbers, letters, and other data or commands. PDAs, and other portable computers, can also use handwriting recognition software. When a user writes characters or numbers on the display, the PDA can recognize the character or number and translate the writing into representative data for storage or manipulation in the computing device.

Simulated keypads or handwriting recognition techniques may not be desirable for entering and accessing data into some small portable computers. Instead, users may prefer to enter data with a keyboard. Many PDAs, however, do not include a keyboard because a traditional keyboard is too large. Carrying a large keyboard with a small PDA would be inconvenient and impracticable. Further, a large traditional keyboard would limit the portability of the small computing device.

SUMMARY

In one embodiment, a personal digital assistant comprises a body having a display; and a keyboard attached to the body, the keyboard being divided into two separate sections and being foldable between a closed position and an open position, wherein the keyboard provides a cover for the body in the closed position and functions as an alphanumeric keyboard to input data in the open position.

In another embodiment, a method comprises covering at least a portion of a body of a personal digital assistant (PDA) with an attached keyboard while the keyboard is in a closed position; moving the keyboard from the closed position to an open position; and typing on the keyboard to input data into the PDA.

Other embodiments and variations of these embodiments are shown and taught in the accompanying drawings and detailed description.

DETAILED DESCRIPTION

Figure 1:
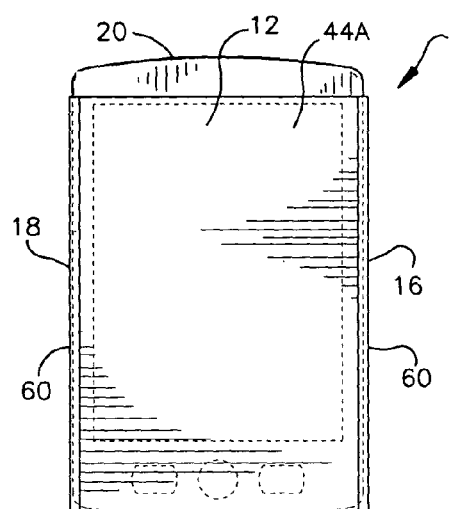
FIG. 1 is a top view of a portable computing device with a keyboard in a closed position.
Figure 2:
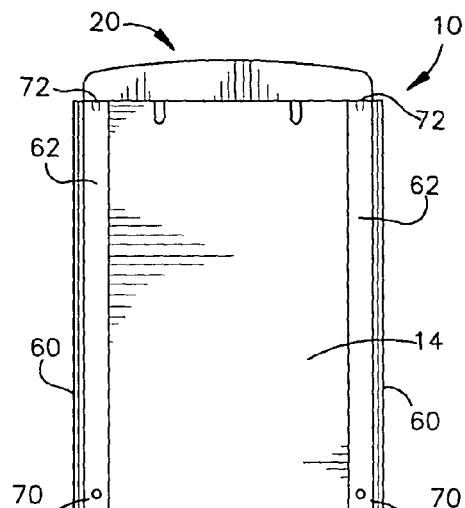
FIG. 2 is a bottom view of the portable computing device of FIG. 1.
Figure 3:
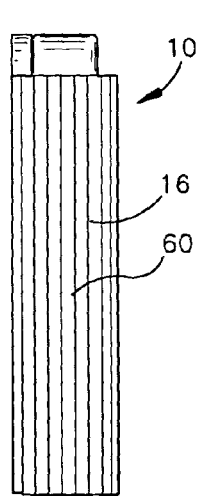
FIG. 3 is a side view of the portable computing device of FIG. 1.

FIGS. 1–7 show a portable computing device 10 in accordance with one exemplary embodiment. For convenience of illustration, a personal digital assistant (PDA) is illustrated in and discussed in connection with the following figures. Embodiments in accordance with the present invention, though, are not limited to PDAs or any particular type of portable computing device. By way of example, embodiments in accordance with the present invention include, but are not limited to, portable computers, handheld computing devices, calculators, organizers, PDAs, and other portable electronic devices and systems.

In a closed position, the PDA 10 generally has a top 12, back 14, two sides 16 and 18, and two ends 20 and 22. The PDA can function as a computer and can house and comprise a central processing unit (CPU), memory, infrared ports, card slots, batteries, USB ports or other input/output (I/O) ports, power and network connectors, and numerous buttons and switches, just to name a few examples. Many of these features are generally shown at 30 (FIG. 6, with the internal components shown in phantom). The PDA 10 also includes a display or screen 32, such as a touch sensitive or pressure sensitive liquid crystal display (LCD). An electrical connector 36 is positioned along end 22 and is adapted to electrically couple and communicate with a cradle or stand.

Figure 6:
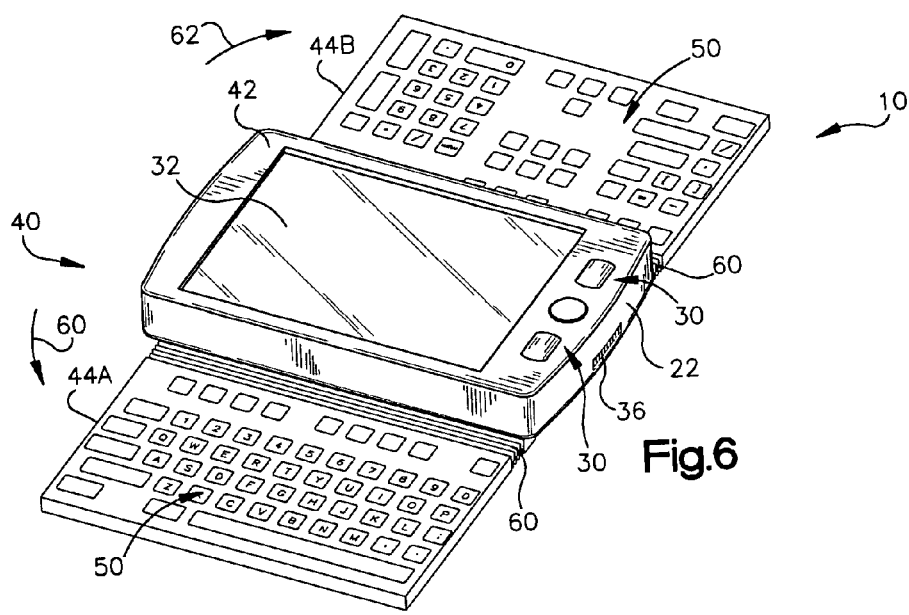
FIG. 6 is a perspective view of the portable computing device of FIG. 1 with the keyboard in an open position.

The PDA 10 also comprises a foldable keyboard 40 that is mechanically and electrically coupled to a body 42 of the PDA. The keyboard 40 is divided into two halves 44A and 44B. Each half has a substantially planar surface with a plurality of touch sensitive or pressure sensitive keys 50. These keys can be positioned on the halves 44A and 44B to emulate the keys on a traditional "QWERTY" keyboard that is divided. The halves 44A and 44B can be similarly shaped and size and substantially coplanar when in an open position (such as shown in FIGS. 6 and 7).

Figure 4:
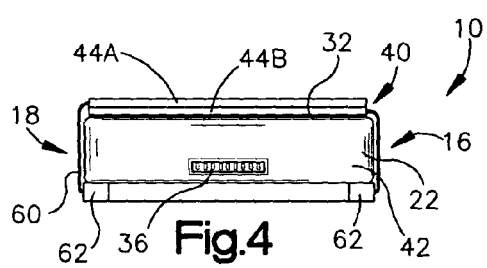
FIG. 4 is an end view of the portable computing device of FIG. 1.

The keyboard is moveable or foldable to a plurality of different positions about the body portion of the computing device. FIGS. 1–5, for example, show the keyboard 40 in a closed position. In this position, the halves 44A and 44B are vertically stacked on top of each other. As shown, half 44B lays or abuts against display 32 and is sandwiched between body 42 and half 44A. In this closed position, the halves 44A and 44B have a shape that corresponds to the shape of body 42. As such, the keyboard does not add to the overall length or width of the PDA. As best shown in FIG. 4, the keyboard adds slightly to the height or thickness of the PDA by an amount equal to the thickness of the halves 44A and 44B.

The keyboard 40 is also moveable to various open positions. From the closed position (shown in FIGS. 1–4), the half 44A is rotated counterclockwise (as shown by arrow 60 in FIG. 6), and half 44B is rotated clockwise (as shown by arrow 62 in FIG. 6). Each half is now adjacent body 42 and in an open position. Half 44A can then be rotated 90° (as shown by arrow 52 in FIG. 7), and half 44B can then be rotated 90° (as shown by arrow 54 in FIG. 7). Each half is now positioned below body 42 and in a fully extended open position. The keyboard 40 can be closed in a reverse manner. Thus, the keyboard 40 can move back and forth from the closed position (FIGS. 1–5) to the open position (FIG. 6) to the fully extended open position (FIG. 7).

Figure 7:
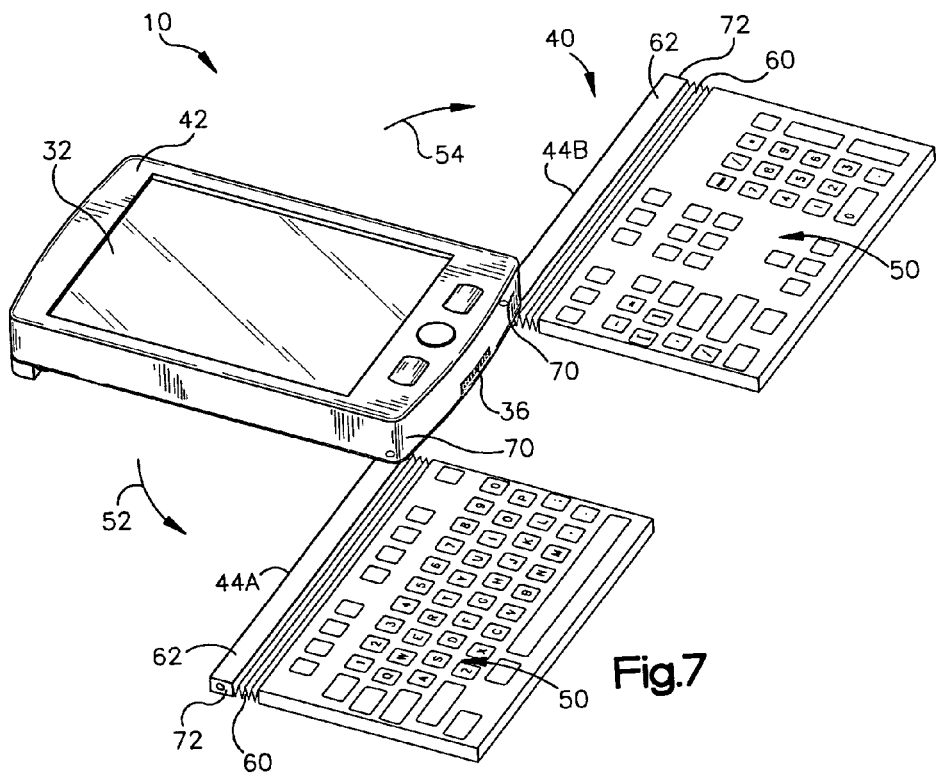
FIG. 7 is a perspective view of the portable computing device of FIG. 1 with the keyboard in an extended open position.

FIG. 7 shows the keyboard 40 in a fully extended position with the halves positioned side-by-side. In this position, the keyboard can function as a traditional "QWERTY" alphanumeric keypad or a traditional numeric keypad. Of course, the keyboard 40 is smaller in size than a traditionally sized keyboard. The actual size of keyboard will vary depending on the size of the body of the computing device. Preferably, the keyboard is not larger than the length and width of the computing device. For the embodiment shown in FIG. 7, the halves 44A and 44B have a size that is equal to the length and width of the body of the PDA. For illustration only and not to limit embodiments in accordance with the invention, the halves 44A and 44B can have a length of about 4.5 inches and a width of about 3 inches. This length and width approximate or equal a typical length and width of a PDA. Of course, the length and width of the halves could be larger or smaller to accommodate differently sized PDAs.

In one embodiment, the keyboard 40 comprises a flexible membrane keyboard having touch sensitive or pressure sensitive key areas on a planar surface. The keyboard could comprise opposed flexible plastic or polymeric membranes that house pressure sensitive switches identifiable with particular letters, numbers, symbols, and functions for inputting data into the computing device.

The keyboard 40 does not have to comprise a flexible membrane configuration or have any particular embodiment. The keyboard, for example, could have a hard plastic outer shell. Pressure or touch sensitive key areas could be disposed along an inner side of this shell. Preferably, the keys or key areas are configured as touch or pressure sensitive so a user can use fingers to type onto the keyboard and enter information into the computing device.

The keyboard is multi-functional. As noted, the keyboard functions to enter data into the computing device and can perform functions of a traditional keyboard. The keyboard also serves as a cover for the body of the computing device. As shown in FIGS. 1–5 for the closed position, half 44B covers and protects display 32. Further, half 44A covers and protects the body 42 of the PDA. The keyboard, thus, can additionally function as a protective cover, lid, or housing for the computing device.

The keyboard 40 can connect to the computing device in a plurality of different ways and still be within the scope and spirit of the invention. By way of example and not to limit the invention, FIGS. 1–7 show one example connection between the keyboard 40 and body 42 of PDA 10. Each half 44A and 44B comprises a flexible membrane 60 that connects to a support member 62. The support member 62 has an elongated body with one end 70 that pivotally connects to the body 42 and a second end 72 that removably connects to the body.

Ends 70 can be connected to the body in a variety of different ways that provide a rotational or moveable connection. For example, a hinge or pivotal connection can be used to enable the keyboard halves 44A and 44B to rotate from the open position (FIG. 6) to the fully extended open position (FIG. 7).

Figure 5:
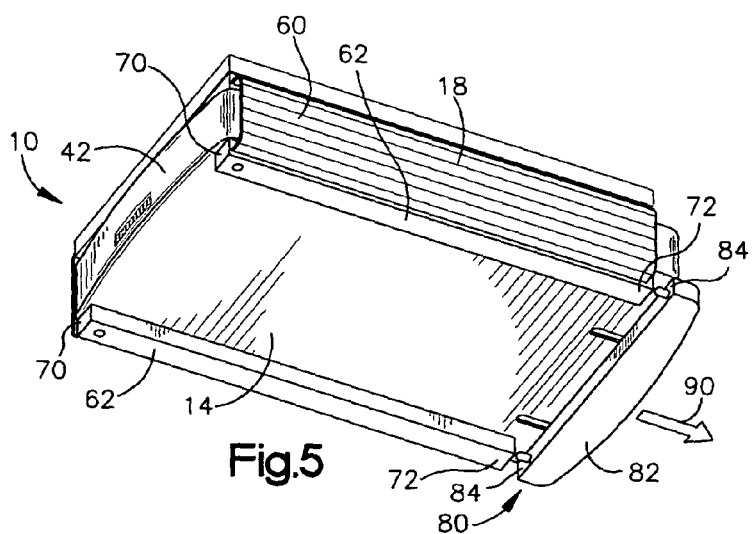
FIG. 5 is a bottom perspective view of the portable computing device of FIG. 1.

Ends 72 can be attached to the body in a variety of different ways that provide a removable connection. FIG. 5, for example, shows a latching mechanism 80. Here, a U-shaped latch 82 has two ends 84 that engage ends 72 of the support member 62. When the latch is moved in the direction of arrow 90, ends 84 disengage from ends 72 and enable the support members 62 to be rotated or moved about the ends 70.

The keyboard is both electrically and mechanically attached to the body of the computing device. Looking to FIG. 7, for example, electrical coupling can pass from each half 44A and 44B, through the flexible membrane 60, through the ends 70, and into the body 42 of PDA 10 to communicate with the processor.

Figure 8:
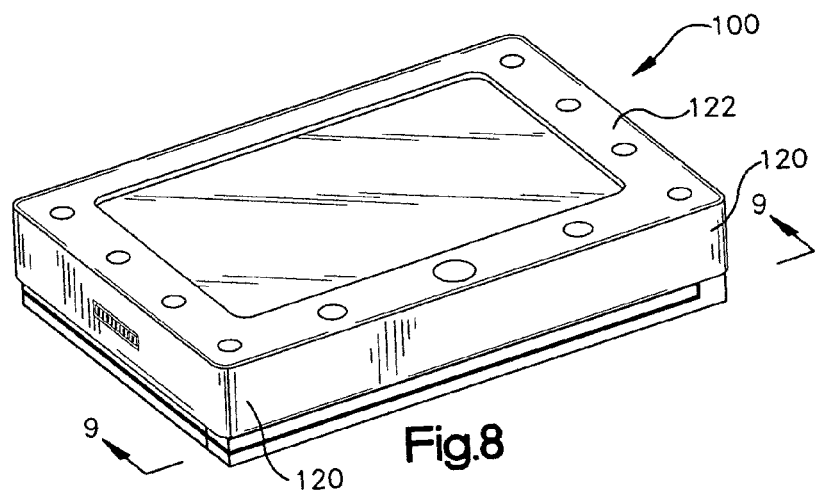
FIG. 8 is a perspective view of another embodiment of a portable computing device with a keyboard in a closed position.
Figure 9:
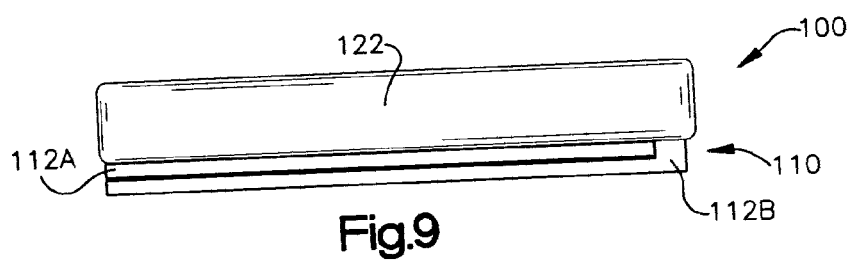
FIG. 9 is a side view taken along the lines 9—9 of FIG. 8.
Figure 10:
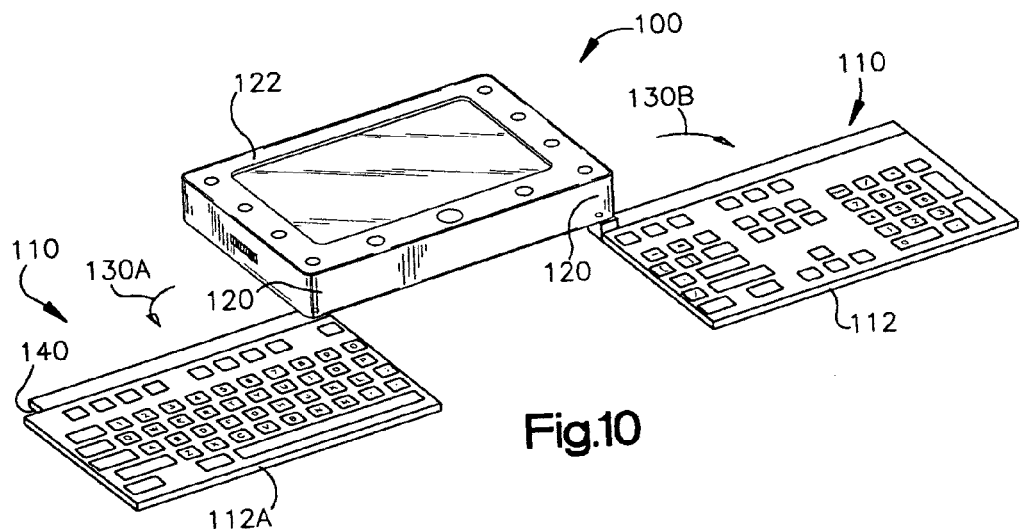
FIG. 10 is a perspective view of the portable computing device of FIG. 8 with the keyboard in an extended open position.

Preferably, the keyboard is attached to the body of the computing device such that the keyboard can move between an open position and a closed position. In the open position, the keyboard can function to input data into the computing device when a user taps or types on key areas. In the closed position, the keyboard performs another function, such as a cover, lid, stand, or housing, to name a few examples. The mechanisms by which the keyboard mechanically attaches or electrically couples to the computing device can vary considerably and still be within the scope and spirit of the invention. FIGS. 8–10 show one such alternate example.

FIGS. 8–10 show a computing device 100 configured in a landscape orientation. Although landscape orientation is shown, embodiments shown in FIGS. 8–10 (and embodiments shown in FIGS. 1–7 and other embodiments) may equally be used with portrait orientation or other orientations. The computing device 100 can be similarly configured to the computing device 10 shown and described in connection with FIGS. 1–7. As one difference, the keyboard 110 comprises two halves 112A and 112B that rotationally connect at two corners 120 of body 122. Corners 120 can include, for example, a hinge or pivotal connection so the halves 112A and 112B can rotate along arrows 130A and 130B, respectively, between the closed position (FIGS. 8 and 9) and the open position (FIG. 10). Further, a notch or recess 140 is provided on half 112A to accommodate the hinge connection at corner 120 for half 112B. In this alternate embodiment, the computing device does not include several features shown in FIGS. 1–7, such as the flexible membrane, the support member, or the latching mechanism.

While the invention has been disclosed with respect to a limited number of embodiments, those skilled in the art will appreciate, upon reading this disclosure, numerous modifications and variations. It is intended that the appended claims cover such modifications and variations and fall within the true spirit and scope of the invention.

What is claimed is:

1. A personal digital assistant, comprising:
    a body having a display; and
    a keyboard attached to the body and being foldable between a closed position and an open position, wherein the keyboard provides a cover for the body in the closed position, functions as an alphanumeric keyboard to input data in the open position, and is divided into two mechanically separated sections in the open position.

2. The personal digital assistant of claim 1 wherein each section of the keyboard has a size and shape similar to the body.

3. The personal digital assistant of claim 1 wherein the sections are stacked on top of the body in the closed position.

4. The personal digital assistant of claim 1 wherein the sections are pivotally connected to the body and rotationally move between the closed and open positions.

5. The personal digital assistant of claim 1 wherein at least one of the sections covers the display in the closed position.

6. The personal digital assistant of claim 1 wherein the keyboard covers a portion of the body in the closed position and unfolds to function as the alphanumeric keypad in the open position.

7. The personal digital assistant of claim 1 wherein a first section is over a surface of the body and a second section is on top of the first section.

8. The personal digital assistant of claim 1 wherein the keyboard does not add to the overall length or width of the body in the closed position.

9. The personal digital assistant of claim 1 wherein the two sections comprise a first section pivotally connected to a first portion of the body, and a second section pivotally connected to a second, different portion of the body.

10. A method, comprising:
  covering at least a portion of a body of a personal digital assistant (PDA) with an attached keyboard while the keyboard is in a closed position;
  moving the keyboard from the closed position to an open position by rotating two separated sections of the keyboard that are each pivotally connected to different portions of the body; and
  typing on the keyboard to input data into the PDA.

11. The method of claim 10 wherein moving the keyboard further comprises unfolding the two separated sections of the keyboard.

12. The method of claim 10 wherein moving the keyboard further comprises rotating the keyboard from a first position covering at least a portion of the body to a second position with two keyboard halves positioned side-by-side and below the body.

13. The method of claim 10 further comprising stacking the two sections of the keyboard in the closed position.

14. The method of claim 13 further comprising unstacking the two sections in the open position.

15. The method of claim 10 wherein moving the keyboard from the closed position to an open position further comprises rotating a first section of the keyboard in a clockwise direction and rotating a second section of the keyboard in a counterclockwise direction.

16. A portable computing device, comprising:
  a body having a display coupled to a processor and memory; and
  an alphanumeric keyboard electrically and mechanically coupled to the body and including two separated sections that are pivotally connected to different portions of the body, wherein the keyboard provides a housing for at least a portion of the body in a closed position and is movable to an open position for typing data.

17. The portable computing device of claim 16 wherein the two separated sections are movable to vertically stack onto each other in the closed position.

18. The portable computing device of claim 16 wherein a first of the two sections is rivotally connected to a first corner of the body and a second of the two sections is pivotally connected to a second corner of the body.

19. The portable computing device of claim 16 further comprising a flexible member coupling the keyboard to the body.

20. The portable computing device of claim 16 wherein the keyboard has touch-sensitive key areas for entering data.

21. The portable computing device of claim 16 wherein the keyboards folds to a size approximately equal to a size of the body while in the closed position and while attached to the body.

* * * * *

UNITED STATES PATENT AND TRADEMARK OFFICE
CERTIFICATE OF CORRECTION

PATENT NO.       : 7,031,143 B2                                     Page 1 of 1
APPLICATION NO.  : 10/661925
DATED            : April 18, 2006
INVENTOR(S)      : Jeffrey C. Madsen et al.

It is certified that error appears in the above-identified patent and that said Letters Patent is hereby corrected as shown below:

In column 6, line 23, in Claim 18, delete "rivotally" and insert -- pivotally --, therefor.

Signed and Sealed this

Fifth Day of May, 2009

JOHN DOLL
*Acting Director of the United States Patent and Trademark Office*